United States Patent [19]
Gautier et al.

[11] Patent Number: 5,737,919
[45] Date of Patent: Apr. 14, 1998

[54] MASTER CYLINDER WITH IMPROVED SAFETY

[75] Inventors: Jean Pierre Gautier; Ulysse Verbo, both of Aulnay-Sous-Bois; Miguel Perez Revilla, Argenteuil; Flavio Cobianchi, Drancy, all of France

[73] Assignee: Bosch Systems De Freinage, Drancy, France

[21] Appl. No.: 428,095

[22] PCT Filed: Apr. 12, 1995

[86] PCT No.: PCT/FR95/00467

§ 371 Date: Mar. 7, 1997

§ 102(e) Date: Mar. 7, 1997

[87] PCT Pub. No.: WO95/32115

PCT Pub. Date: Nov. 30, 1995

[30] Foreign Application Priority Data

May 20, 1994 [FR] France .................... 94 06142

[51] Int. Cl.⁶ .................. B60R 21/00; B60T 7/00; F16D 65/32
[52] U.S. Cl. .......................... 60/403; 60/591
[58] Field of Search .............. 60/591, 533, 403; 92/169.1

[56] References Cited

U.S. PATENT DOCUMENTS

| 5,051,063 | 9/1991 | Vasselet ................... 303/59 |
| 5,634,337 | 6/1997 | Gautier et al. ............. 60/403 |

FOREIGN PATENT DOCUMENTS

| 3741881 | 7/1988 | Germany . |
| 93-07274 | 7/1993 | Germany . |
| 2230493 | 10/1990 | United Kingdom . |

*Primary Examiner*—Sheldon Richter
*Attorney, Agent, or Firm*—Leo H. McCormick, Jr.

[57] ABSTRACT

A master cylinder comprising a body (4) pierced with a bore (5) closed on a first side by an end (6) and on a second side by a piston (7). The piston (7) slides in the bore (5) to delimit a pressure chamber (8). The pressure chamber (8) is connected by a pressure pipe (12) to at least one brake motor through an outlet (11) therein. The chamber (8) and the pressure pipe (12) together delimiting a working volume filled with a hydraulic fluid. The working volume is partially delimited by a leak-off device (19) which is responsive to an impact to selectively allow hydraulic fluid to leak off toward the outside of the working volume.

7 Claims, 3 Drawing Sheets

MASTER CYLINDER WITH IMPROVED SAFETY

The present invention relates to a master cylinder comprising a body pierced with a bore closed on one side by an end and on the other by a piston which slides in this bore therein delimiting a pressure chamber which is connected to at least one brake motor through an outlet of this chamber and through a pressure pipe, the chamber and the pressure pipe together delimiting a working volume filled with a hydraulic fluid.

In practice, all master cylinders used in the hydraulic braking circuits of motor vehicles since the latter were invented correspond to this definition.

The improvement in safety standards has revealed the need to develop master cylinders in a way such that a frontal impact applied to the vehicle cannot easily be transmitted to the leg of the driver by the master cylinder, even when the impact occurs while he driver is pressing as hard as he can on the brake pedal.

The present invention falls within this context, and its object is to propose a master cylinder which meets this requirement.

To this end, the master cylinder of the present invention is essentially characterized in that the working volume is partially delimited by a leak-off device which, in response to an impact which is applied to it, selectively allows hydraulic fluid to leak off towards the outside of this working volume.

According to a first possible embodiment, the leak-off device essentially comprises a valve including a closure piece controlled by a push rod projecting out of the working volume, this valve being capable of opening the working volume to the outside in response to a translational movement carried out by the push rod under the effect of an impact.

In this case the valve exhibits, for example, a wall pierced with an orifice which reduces it to an annular surface surrounding this orifice, and the closure piece exhibits a shoulder which interacts with this annular surface, along a closed curve surrounding the orifice and by means of an annular seal, in order to close off the wall in a sealed fashion when this closure piece is in a position of rest.

The valve may comprise a cylindrical body outside the master cylinder, closed off by the closure piece and in which the latter is translationally mounted, or the wall of the valve may be made up of the end of the master cylinder, this valve thus being housed in the master cylinder and forming an integral part of the latter.

In any case it is preferable for the closure piece to be urged into a position of rest by a spring.

In another possible embodiment the leak-off device comprises a fragile hollow body, outside the master cylinder, and capable of breaking under the effect of an impact.

Other characteristics and advantages of the invention will emerge clearly from the description thereof which is given hereafter, by way of non-limiting indication, with reference to the appended figures, among which:

Figure 1:
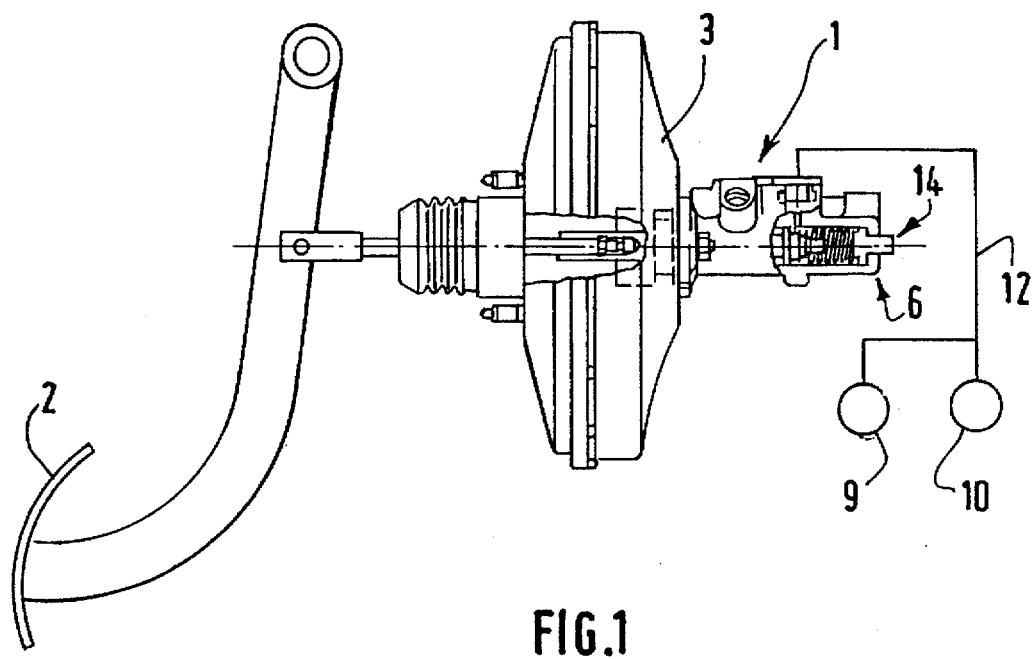
FIG. 1 is a view in partial section of a braking system incorporating a master cylinder in accordance with a first embodiment of the invention.

As FIG. 1 shows, a hydraulic braking system conventionally comprises a master cylinder 1 actuated by a pedal 2, usually through a booster servo 3 which amplifies the force exerted on the pedal 2.

The master cylinder 1 itself comprises (FIG. 2) a body 4 pierced with a bore 5 closed on one side by an end 6 and on the other by a piston 7 which slides in this bore therein delimiting a pressure chamber 8 which is connected to at least one brake motor 9, 10 through an outlet 11 of this chamber and through a pressure pipe 12.

The chamber 8 and the pressure pipe 12 together delimit a working volume filled with a hydraulic fluid, which allows each brake motor 9, 10, connected to the master cylinder.

According to the invention, the working volume 8, 12 is partially delimited by a leak-off device which, in response to an impact which is applied to it, selectively allows hydraulic fluid to leak off towards the outside of this working volume.

In the embodiment of FIGS. 1 to 4 this leak-off device essentially comprises a valve including a closure piece 13 controlled by a push rod 14 projecting out of the working volume, this valve being capable of opening the working volume to the outside in response to a translational movement carried out by the push rod 14 under the effect of an impact.

Figure 2:
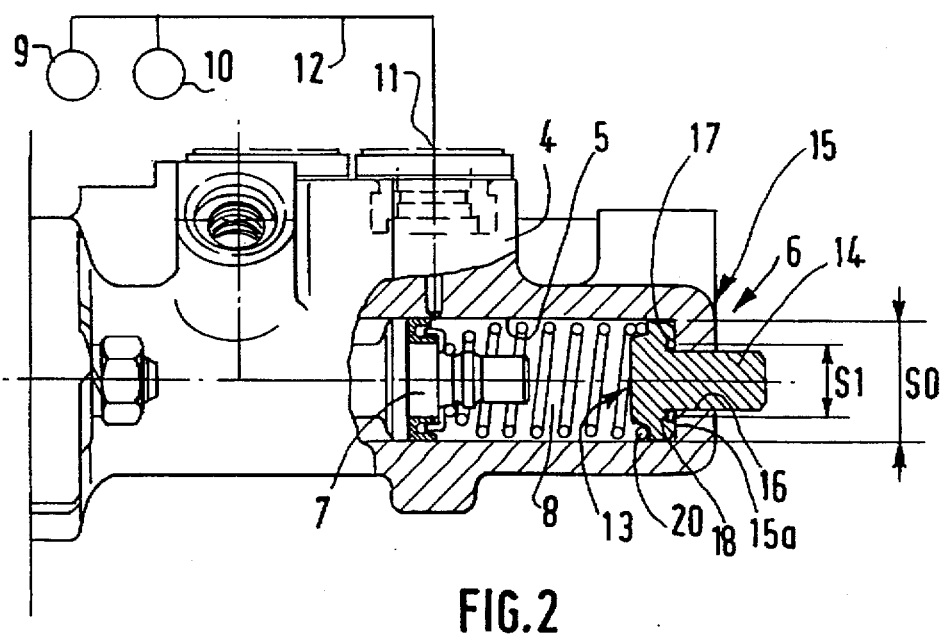
FIG. 2 is a view in partial section of such a master cylinder.
Figure 3:
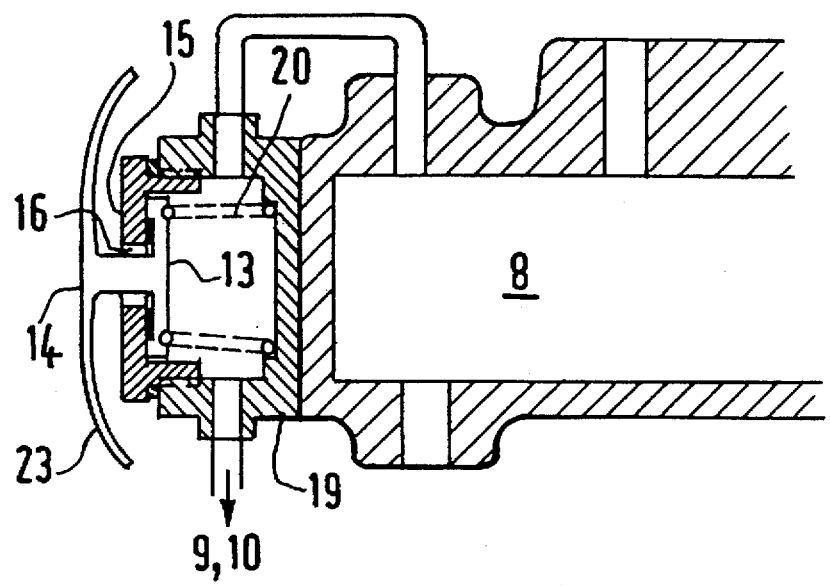
FIG. 3 is a view in partial section of a master cylinder in accordance with a variant of the first embodiment of the invention.

In the embodiment of FIGS. 1 to 3 the valve exhibits a wall 15 pierced with an orifice 16 which reduces it to an annular surface surrounding this orifice, and the closure piece 13 exhibits a shoulder 17 which interacts with this annular surface along a closed curve of area S1 surrounding the orifice and by means of an annular seal 18 in order to close off the wall 15 in a sealed fashion when this closure piece 13 is in a position of rest, as illustrated in the figures.

The wall 15 of the valve may be made up of the end of the master cylinder itself, this valve thus being housed in the master cylinder and forming an integral part of the latter, as the embodiment of FIGS. 1 and 2 shows.

Figure 4:
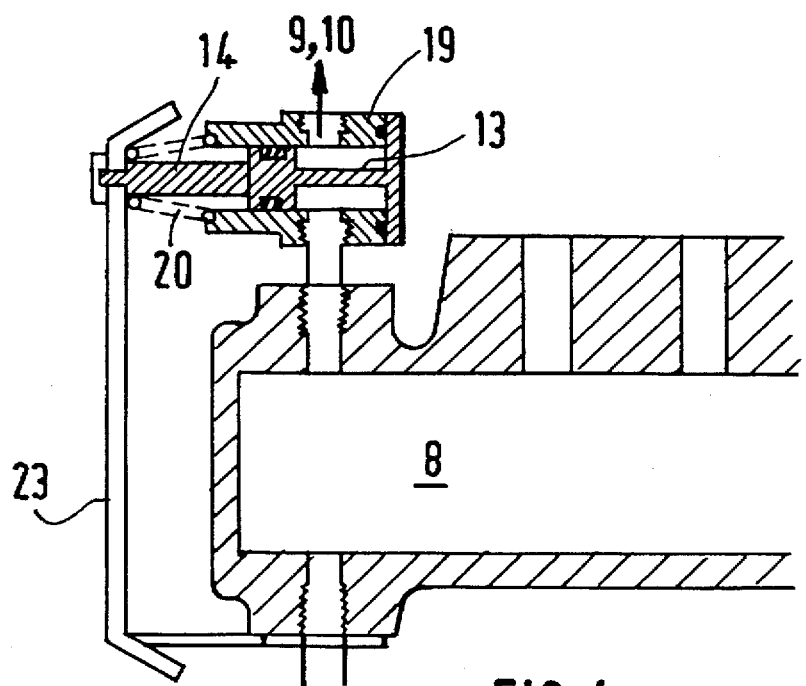
FIG. 4 is a view in partial section of a master cylinder in accordance with a second variant of the first embodiment of the invention.

However, the valve may equally well comprise a cylindrical body 19 outside the master cylinder, closed off by the closure piece and in which the latter is translationally mounted, as FIGS. 3 and 4 show.

In all cases it is advantageous for the closure piece to be urged into a position of rest by a spring 20, in which position it fulfils its closure function.

As FIG. 4 shows, the closure piece 13 may be designed to close off the two faces of the cylindrical body 19.

Figure 5:
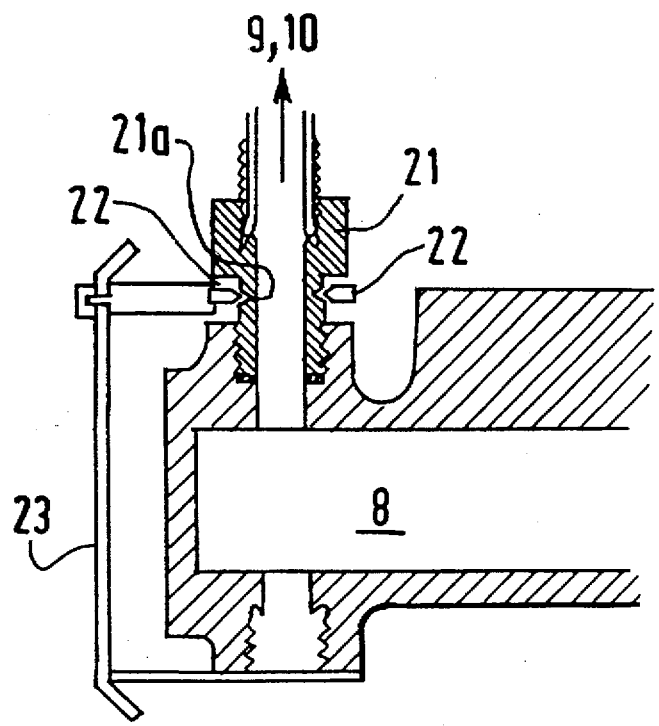
FIG. 5 is a view in partial section of a master cylinder in accordance with a second embodiment of the invention.
Figure 6:
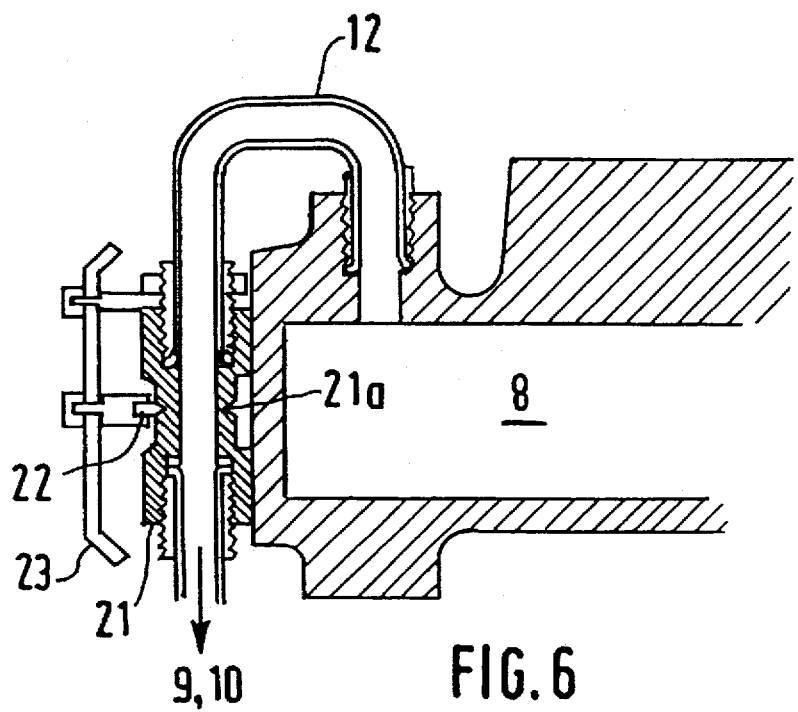
FIG. 6 is a view in partial section of a master cylinder in accordance with a variant of the second embodiment of the invention.

According to another embodiment of the leak-off device, represented in FIGS. 5 and 6, the latter comprises a fragile hollow body 21 outside the master cylinder 1 and capable of breaking under the effect of an impact.

For example, the hollow body 21 may be produced from a lightweight alloy and may exhibit weaker zones such as 21a against which knives 22 bear, exerting a shear force on the hollow body 21 in the event of an impact.

In all the embodiments it is preferable for the closure piece 13 in the case of FIGS. 3 and 4, or the knives 22 in the case of FIGS. 5 and 6 to be controlled in terms of position by push members having a large surface area, such as 23, mounted at the front of the master cylinder in the direction of travel of the vehicle equipped with the invention.

By virtue of these characteristics a frontal impact on the vehicle has the effect of driving in the closure piece 13 or of giving rise to breakage of the hollow body 21, which results in the braking liquid present in the working volume 8, 12 escaping to the outside.

Under these conditions the pressure in the chamber 8 instantaneously drops, so that even if the body of the master cylinder is pushed back towards the pedal, the latter passes on to the driver only a relatively small force insofar as the piston 7 can slide freely in the bore 5.

We claim:

1. A Master cylinder comprising a body pierced with a bore closed on a first side by an end and on a second side by a piston which slides in said bore to delimiting a pressure chamber, said pressure chamber being connected by a pressure pipe to at least one brake motor through an outlet of said chamber, said chamber and pressure pipe together delimiting a working volume which is filled with a hydraulic fluid, characterized in that said working volume is furthermore partially delimited by a leak-off device, said leak-off device responding to an impact to selectively allow hydraulic fluid to leak off towards the outside of said working volume.

2. The master cylinder according to claim 1, characterized in that said leak-off device comprises a fragile hollow body located outside of the master cylinder, said hollow body being capable of breaking under the effect of an impact.

3. The master cylinder according to claim 1, characterized in that said leak-off device essentially comprises a valve including a closure piece controlled by a push rod projecting out of the working volume, said valve being capable of opening said working volume to the outside in response to a translational movement carried out by said push rod under the effect of an impact.

4. The master cylinder according to claim 3, characterized in that said closure piece is urged into a position of rest by a spring.

5. The master cylinder according to claims 3, characterized in that said valve comprises a cylindrical body located outside said master cylinder and closed off by said closure piece, said master cylinder being translationally mounted in said cylindrical body.

6. The master cylinder according to claim 3, characterized in that said valve exhibits a wall pierced with an orifice which reduces it to an annular surface surrounding said orifice, and in that said closure piece exhibits a shoulder which interacts with said annular surface along a closed curve which surrounds said orifice and an annular seal to close off said wall in a sealed fashion when said closure piece is in a position of rest.

7. The master cylinder according to claim 6, characterized in that said wall of the valve is made up of the end of said master cylinder, said valve being housed in the master cylinder and forming an integral part thereof.

* * * * *